Jan. 12, 1960   O. BRETSCHNEIDER ET AL   2,920,951
PROCESS FOR THE CONTINUOUS PRODUCTION OF EASILY VAPORIZABLE METALS
Filed June 20, 1956
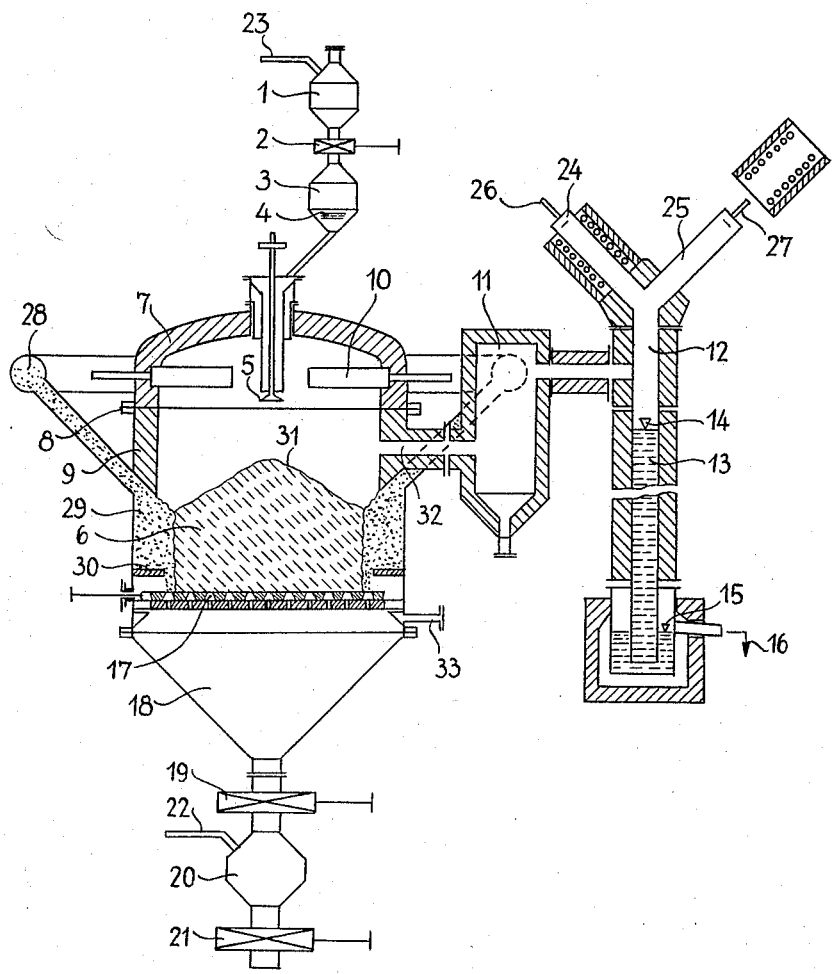
OTTO BRETSCHNEIDER
GERHART JAEKEL
LUDWIG BENDER
KARL ZIEKE
INVENTORS

United States Patent Office 2,920,951
Patented Jan. 12, 1960

2,920,951

PROCESS FOR THE CONTINUOUS PRODUCTION OF EASILY VAPORIZABLE METALS

Otto Bretschneider and Gerhart Jackel, Knapsack, near Koln, Ludwig Bender, Bruhl, near Koln, and Karl Zieke, Hurth, near Koln, Germany, assignors to Knapsack-Griesheim Aktiengesellschaft, Knapsack, near Koln, Germany, a corporation of Germany Application June 20, 1956, Serial No. 592,620

Claims priority, application Germany June 23, 1955

5 Claims. (Cl. 75—10)

The present invention relates to a process and to an apparatus for the continuous production of easily vaporizable metals by reduction of corresponding metal compounds.

Many industrial processes are known for the thermal production of metals, wherein the metal is formed in the vaporous state from the reaction mixture. These processes are carried out using the so-called retort method and the heat necessary for the reaction is transferred by radiation to the mixture to undergo reaction. The retorts used are made of tinder-proof steel or ceramic material, but the wall temperature cannot exceed 1200° C. At this temperature, however, the transfer of heat to the reaction material is so small that very long reaction times are necessary.

Also in the case of rotary furnaces which, for example, have been proposed to be used for the thermal production of magnesium, the reaction heat is transferred to the reaction material by radiation. In this case, the material can be heated on the surface up to 1350° C. When this temperature is exceeded, the mixture commences to stick together and thus affects the reaction muffle. With the use of a rotary furnace, however, only a small amount of energy is absorbed at 1350° C., so that several hours are necessary to complete the reaction.

In addition thereto, many of these processes are carried out discontinuously with radiation heating, whereby the yield per unit of volume and time is strongly reduced, so that it has not been possible hitherto to construct a high power apparatus.

Thus, for example, a briquetted mixture of 100 parts by weight of burned dolomite containing 38% of magnesium oxide, and 26 parts by weight of ferro-silicon containing 75% of silicon, absorbs during a complete reaction only about 1 watt per cm.$^2$ of surface at a depth of penetration of 20 mm. and a surface temperature of 1350° C. All processes hitherto known and carried out with heat transfer by radiation accordingly never exceed a radiation density of 1 watt per cm.$^2$ of surface of the material to undergo reaction. Other processes for the thermal production of magnesium starting with a mixture other than described above behave similarly corresponding to their analogous energy requirements.

Now we have found that all the aforesaid disadvantages can be overcome by the process of this invention, wherein the energy is supplied to the surface of the resting reaction mass continually by radiation, and the reaction is performed within a short time.

As has already been stated above, this invention relates to a process for the continuous production of easily vaporizable metals and, more especially, of metals the boiling point of which is between about 400° C. and about 2000° C. under a pressure of 10 mm. of mercury, by thermal reduction of corresponding metal compounds. The heat necessary for carrying out the reaction is transferred by radiation onto the surface of the reaction material spread out in a thin layer, in which case the non-volatile and reacted residue retained after the reaction is sunk in the reaction chamber and then serves as a support for freshly introduced reaction material.

The reaction heat is especially well transferred by radiation with application of so high a density of energy that the amount absorbed by the surface of the reaction mass in the average of time and per cm.$^2$, is between about 1 and about 10 watts, preferably 4 watts and 8 watts; the reaction mass may partially or wholly be converted into a soft state.

The term "in the average of time" as used herein means that the energy transferred within 1 hour is between about 1 to about 10 kwh. per 1000 cm.$^2$.

The reacted hot residue is retained, preferably on a grate, upon which it is decomposed upon cooling and through which it is then removed. To this end, it is advisable to move the grate and thus to regulate the velocity of descent of the residue.

In carrying out the process of this invention, it is advantageous to use as sliding layer between the descending reaction product and the wall of the furnace an inert material which is constantly regenerated at about the level of the reaction zone and follows, partially or wholly, the descending product. The material to undergo reaction may wholly or partially, be converted into a soft state.

As the sliding layer, a completely reacted product or a reaction component may be used which at the reaction temperature is subject neither to a sintering nor a melting process. The material serving as sliding layer can constantly be introduced from the side walls and through the walls of the furnace in an angle to the vertical axis of the furnace at about the level of the reaction zone; it may also be introduced in pieces larger than those of the reaction mixture through filling holes at the top of the furnace, in which case the grain size of the sliding layer material in relation to the reaction material is so great that the sliding material rolls over the spread out reaction material to the wall of the furnace. Thus, for example, the reaction mixture may be composed of 100 kg. of burned dolomite containing 38% of magnesium oxide in a grain size between 2 and 10 mm. and 17.5 kg. of ferrosilicon of 75% strength in a grain size of between 0.5 and 2 mm.; in this case, the sliding layer material is used in grains having a diameter of 15 to 30 mm.

The material serving as sliding layer may also be introduced in certain time intervals, for example in intervals of 15–30 minutes, through filling holes for the reaction mixture at the ceiling of the furnace via a rotary mixing plate or another rotary distributing device, the rotation speed of the distributing device being increased during the time necessary to complete introduction. The revolution number of the distributing device depends on the diameter of the furnace; generally, it has proved advantageous to increase the normal speed of about 1½ to about 2 times. The reaction material and the residue may be introduced into or withdrawn from the reaction chamber by means of double charging valves provided with intermediate containers the reaction material being introduced through one or more openings at the top of the reaction chamber.

The reaction material may be distributed in the reaction chamber by means of rotary mixing plates with a periodically variable number of revolutions. It is also possible that in certain intervals of time the free-falling material suddenly strikes the top of the residue cone formed in the furnace, for example in time intervals of about 5 minutes; the quantity of free-falling material is sufficient to cover the residue cone with reaction mixture in a 10 mm. thick layer. In this case, the reaction may be performed intermittently, for example with gas impulses of an inert gas, to prevent demixing.

In order to enable the process of this invention to be carried out continuously, a vertically arranged furnace may be used which comprises the following principal parts: a reaction chamber the upper part of which is exchangeable and provided with a radiation heating; a movable grate which regulates the velocity of descent of the residue and, if desired, can be cooled; a bottom part retaining the residue and arranged beneath the grate; double charging valves provided with intermediate containers; these valves serve for the introduction of the reaction material and removal of the residue; openings at the ceiling of the upper part for introducing the reaction mass into the furnace; rotary mixing plates with a periodically variable number of revolutions for the distribution of the reaction mass in the furnace; and a discharge and a condensation device for the metal vapor.

For the introduction of the sliding material at the side walls of the furnace, a sloping pipe system may be arranged provided with storage facilities and a device for the introduction of the sliding material.

The energy is supplied to the surface of the reaction material advantageously in a high density. By means of a source arranged above the material, heat is so intensively radiated to the surface of the reaction material that the energy absorbed per $cm.^2$ of surface is between about 1 watt and about 10 watts, preferably between about 4 and 8 watts.

Due to the high density of energy, the reaction mixture may traverse various states of plasticity.

The degree of plasticity can be regulated by varying the layer thickness of the reaction material. In the case where a thin layer is applied, i.e. a layer having a thickness of about 1 mm. to about 20 mm., the radiation density and hence the capacity of the furnace can considerably be increased without affecting the degree of plasticity.

The reaction material may also be spread out beneath the source of radiation in a layer thicker than indicated above, for example in a thickness of up to 70 mm., it being, however, advantageous to apply a fairly thin layer of up to about 20 mm. in order to attain a high efficiency per unit. The electric charge of the furnace may be so high that, after deduction of the losses caused by radiation and by the cooling water, yet the above mentioned degree of effective energy which is radiated only to a relatively small surface of the reaction material is retained. In this case, the reaction mass may be subject to softening phenomena or may even melt; such phenomena are, however, not detrimental to a continuous operation because the residue retained after the reaction is sunk proportionally with the material constantly introduced into the reaction zone from above.

The residue is retained on a grate through the bars of which may flow a cooling medium. On this grate the strongest cooling effect is displayed so that the reacted mixture at the latest solidifies on the grate or bursts, or in the case where the mixture contains calcium orthosilicate, disintegrates to form a fine power due to the changes in modification. The residue so distributed falls automatically through the grate and can then be withdrawn from the furnace in the form of a cooled powder.

The cooled grate may be moved constantly or periodically or may be rotated, whereby the amount of residue falling through the grate is regulated and hence the velocity of descent of the sinking residue. The rods of the grate may be constructed so that by moving them the lumpy residue is comminuted and can then be removed.

The reaction material and the residue are introduced into and withdrawn from the reaction chamber by means of double charging valves provided with intermediate containers the reaction mixture being introduced from above and spread out onto the surface of the residue in as uniform a layer as possible, thus enabling the process of this invention to be carried out continuously. To this end, the material may be allowed to fall on the surface of the residue through one or more openings at the top of the furnace.

To prevent demixing, the material may also be introduced in short intervals in free fall in an amount such that in each particular case the surface of the residue is covered with a thin layer having a thickness of about 1 to 20 mm. Demixing of the material to undergo reaction can effectively be prevented by means of gas impulses of an inert gas introduced into the furnace together with the reaction material. Such intermittent working method enables the surface of the material to be permanently chilled in the furnace and thereby affords an especially loose structure of the residue which can be easily removed from below through the space left in simple grates.

The mixture may also be introduced fairly uniformly by means of a special device, for example, a rotary mixing plate in the middle of the furnace lid. The periodically variable velocity of revolution of the rotary mixing plate enables a large surface to be continually covered with a uniform layer.

For radiation heating, any heating source arranged in the upper part of the furnace is satisfactory. As an electric heating source, there may be used an electric arc or resistance type heating. As resistance material, there may be employed all metals resistant to high temperatures, such as molybdenum, tungsten and the electrically conductive compounds thereof, such as silicide and carbide. Heating elements from coal or graphite may also be used and are arranged in the upper part of the furnace as current carrying radiating elements. In the upper part of the furnace may also be installed an indirect gas heating, but in this case care must be taken that the heating gases do not contact the metal vapors.

The upper part of the furnace which carries the source of radiation is advisably of exchangeable construction.

The metal vapors evolved precipitate as liquid metal in a condenser connected with the furnace, and are tapped.

The process of this invention can be carried out with special advantage using a gas-tight furnace regardless of the pressure conditions applied, i.e. also under reduced pressure; more especially, it can be carried out in a furnace as shown diagrammatically in the accompanying drawing at an absolute gas pressure of about 0.1 mm. to about 800 mm. of mercury. The process may be performed in the atmosphere of an inert gas, for example in a hydrogen atmosphere or a rare gas atmosphere.

Beneath the grate there is arranged the lower part of the furnace upon which the residue is retained. In addition thereto, the furnace possesses an intermediate container each at the upper and lower end. Both containers are provided each at the lower and upper extremity with a charging valve for the introduction and removal of the reaction mass, respectively. Furthermore, the furnace is provided at the top of its upper part with one or more openings for the introduction of the reaction material into the furnace. The reaction material is distributed in the furnace by means of one or more rotary mixing plates with a periodically variable number of revolutions. Finally, the furnace is provided with a discharge valve and a condensation device for the metal vapor evolved during the reaction; these latter devices may be of the conventional type.

Since in the process of this invention the reaction masses are obtained partially in the form of a paste, in which case the solid phase, quantitatively, may be far superior to the liquid phase, it has been difficult to develop a process which allows of performing such processes continually with the use of a gas-tight apparatus, or under reduced pressure. This the more so, since these reactions may be accompanied by such strong sintering phenomena that at the reaction temperatures applied the reaction mass may stick together and thus cannot completely be molten. The attendant adherence of the reaction mixture to the walls of the furnace may involve the risk that the entire mass accumulates in the furnace and does not sink.

By the process of this invention is has now become possible to overcome these difficulties and to prevent the reaction mass from adhering to the walls of the furnace in that between the descending reaction product and the wall of the furnace an inert material which does not sinter at the reaction conditions applied, is used as sliding layer. For making the sliding layer there may be used powdery or granular material or a mixture thereof.

The sliding layer need not be very thick. Thus, for example, it suffices to use a 2 cm. thick layer to meet the requirements. A layer thicker than indicated above may also be used, for example a layer having a thickness of 20 cm. or more; in the case where such a thick layer is used in a furnace, the corresponding places need not be heat-insulated with ceramic material which is replaced by the sliding material and hence can at least partially be saved.

The sliding layer material is constantly renewed inside the furnace at the level of the reaction zone, i.e. in the same proportion as the descending reaction mass is piled up by adding fresh reaction mixture. The sliding layer follows the sticky and descending reaction mass, prevents the latter from contacting the wall of the furnace and is removed at the lower part either separately or together with the reaction mixture by means of a device as described above, for example, a grate.

In the case where a sliding layer is used having a thickness of more than 5 cm., a screening plate serving as a dam may be installed to prevent the major quantity of the sliding material from sinking, so that even in the case of a thick sliding layer only a minor proportion of the sliding material follows the descending reaction mass. The sliding layer is not limited to the use of a furnace having a round cross-section, but extends to any type of furnace.

It has also been found that in many cases a reaction component which neither sinters nor melts at the reaction temperature may also be used as sliding layer.

Alternatively, there may be used as sliding layer a completely reacted product which has already passed the furnace and hence consists of the reacted residue of the starting materials used, or of the finished reaction produced in the furnace.

The sliding material may be introduced into the furnace from the side walls in an angle to the vertical axis of the furnace, for example in an angle of between 30 and 90°. When, for example, a round type furnace is concerned, the sliding material may be introduced radially through the walls of the furnace.

Alternatively, the sliding material may be introduced into the furnace through at least one filling hole at the ceiling of the furnace. When the same filling hole is used for introducing the reaction mixture, the grains of the sliding material must have at least about double the size of the greatest grains of the reaction mixture, so that the sliding layer material rolls to the wall of the furnace over the mixture spread out like a cone. A further possibility consists in that the sliding material is introduced through one or more filling holes at the top of the furnace, each of which is equipped with a rotary mixing plate. The reaction mixture is sprayed onto the surface of the adhesive reaction mass at a normal rotation speed. In certain intervals, the rotation speed of the rotary mixing plate is temporarily increased and hence its range, so that the material serving as sliding layer is flung to the wall of the furnace. The rotation speed of any furnace depends on the range necessary to fling the material to the wall of the furnace. In case operating disturbances occur which may involve too strong a mixing of reaction mixture and sliding layer, that is to say the material to undergo reaction comes into too intimate a contact with the wall of the furnace, the reaction mass may adhere to the wall of the furnace. In such a case, the normal descent of the reaction mass can be reactuated by a sudden difference in the gas pressure prevailing between the space above the surface of the mixture and the space beneath the discharge grate.

The process of this invention is not restricted to the use of a special type of apparatus, but it can be performed with particular advantage using an apparatus as shown diagrammatically in the accompanying drawing which allows of operating under reduced pressure.

In the apparatus prevails an absolute gas pressure of 0.1 mm. up to about 100 mm. of mercury. The optimum vacuum conditions prevail at 26 and 27 where the vacuum pump is connected with the furnace. At point 6 of the furnace where the metal vapor evolves, prevails the highest pressure which may be increased to as high as for example 100 mm. of mercury. The reaction material is introduced according to the principle of double charging valves. While valve 2 is closed, air is blown into container 1 and the reaction material is introduced. After container 1 has been closed and evacuated, valve 2 is opened and the material is conveyed to container 3. The material is then passed through a distributing device 4 and spread out onto the surface of residue 6 by means of a distributing device 5, which in the accompanying drawing represents, for example, a rotary mixing plate. The upper part 7 of the furnace which is heat insulated and connected with the middle part 9 of the furnace by means of a flange 8, carries radiation source 10 which, in this example, represents an electric resistance heating element consisting of graphite which may be composed of several parts. The metal vapor evolved flows through connecting piece 32 over a dust chamber 11 to condenser 12. Dust chamber 11 has the form of a cyclone or may be equipped with reflecting walls. The temperature in dust chamber 11 is kept above the level necessary for condensing the metal vapors, i.e. at a temperature of 800–1200° C. At the place where the metal vapors enter the dust chamber prevails a temperature of about 1200° C. and at the place where the vapors leave the chamber prevails a temperature of 800° C. Dust chamber 11 serves at the same time as condenser for easily condensable impurities of the metal. In liquid condenser 12, the metal vapor evolved is precipitated as liquid metal which drops on barometer column 13 made of liquid metal and maintained at points 14 and 15. Barometer column 13 is kept at 650–750° C. to enable the metal which is run in from above to run off through exit 16 over the swamp formed at 15.

The reacted material 6 is conveyed in downward direction in the same proportion as cooled grate 17 passes the residue to lower part 18. As soon as lower part 18 is filled, fairly to about one half, valve 19 is opened and the residue is conveyed to container 20 previously evacuated. The valve 19 is kept closed, air is injected into container 20 and the content is withdrawn through an opening 21 that can be closed.

Connecting pieces 22 and 23 lead to a vacuum pump (not shown).

Above liquid condenser 12, two condensers 24 and 25 are arranged connected in parallel and with the vacuum pump by means of conduits 26 and 27, with the aid of which the residual metal which has not condensed in liquid form in liquid condenser 12, is precipitated.

The reaction residue may also be removed using a sliding layer of inert material or reacted product in a manner such that by means of a pipe system 28 the material for the sliding layer 29 is introduced, for example, radially from the side walls of the furnace. In this case, sliding layer 29 in the lower part of the furnace serves simultaneously as heat insulating material. A dam 30 arranged in a short distance above discharge grate 17 has the effect that only a small part of the layer moves in downward direction. The reaction material, as has already been described, is introduced through distributor 5 and forms a truncated cone 31 which is surrounded by sliding layer 29.

As heating source for endothermal processes any kind of radiation heating systems may be used.

In the accompanying drawing an electric resistance heating 10 is shown diagrammatically. The gases can be introduced into the furnace through conduit 33.

In addition to the electric radiators shown in the drawing, heating may also be effected with a direct flame. In this case, gas or flame heating need not be performed from above, but may also be effected from below through the discharge grate, especially in those cases where particularly porous material is reacted. When it is inadvisable that the fire gases contact the reaction material, a gas heated radiation heating may be installed through conduit 33.

The process of this invention offers the advantage of enabling for the first time metals to be produced continuously using radiation heating and a completely reacted material which, during the reaction, partly or wholly, has traversed soft states. During the relatively long time of stay of the residue at the necessary reaction temperatures, it is even possible completely to reduce the last residues of metal compounds. The descending residue with its heating capacity lost in other known processes upon the discharge of the furnace, acts in the process of this invention as heat insulation onto a great surface of the furnace, and thus saves considerable heat losses.

The reaction material may be introduced into the furnace in the form of a powder, a granulate or a shaped body. Powdery material advantageously has a fineness of between the finest commercial size and particles of about 0.1 mm. in diameter; a granulate is used in particles having a size of up to about 30 mm., and a shaped body may be used in the form of sausage-like bodies, briquets or similar bodies obtained with the use of known pressing machines.

The process of this invention is suitable for use in the production of all metals which by reduction of the compounds escape from the reaction material in vaporous form with formation of a non-volatile, scarcely fusible residue. In this respect it is immaterial whether the non-volatile and difficultly fusible residue is obtained as reaction component, or derives from impurities or admixtures of the ore. The residue can also be formed by additions during the reaction.

All metals having a vapor pressure of at least 10 mm. of mercury at a temperature within the range of about 400 and about 2000° C. can be produced in the manner described above. More especially, the process of this invention allows of producing alkaline metals, such as potassium, sodium, lithium; the alkaline earth metals, such as calcium, barium, strontium as well as magnesium, zinc and bismuth.

As starting materials there may be used for example, potassium fluoride, sodium sulfate, lithium carbonate, magnesium oxide, dolomite, serpentine, calcium oxide, barium oxide, strontium oxide, zinc silicate, and bismuth ores.

The invention as described above extends also to the products prepared by the process or the apparatus as described herein.

The following examples serve to illustrate the invention, but they are not intended to limit it thereto, the parts being by weight unless otherwise stated.

*Example 1*

100 parts of burned dolomite containing 38% of magnesium oxide and 21 parts of ferro-silicon containing 75% of silicon are heated in the apparatus described above to a temperature of 1600° C. to yield 23 parts of magesium and 98 parts of a residue composed of 90 parts of calcium ortho-silicate and 8 parts of ferro-silicon of 33 percent strength which is recovered. The magnesium formed condenses in the liquid state in the condenser of the apparatus described above. In the apparatus prevails an absolute gas pressure of 0.1 mm. to 100 mm. of mercury. The energy absorption is 6 watts per cm.$^2$ in the average of time.

*Example 2*

100 parts of burned dolomite containing 38 percent of magnesium oxide are mixed with 27 parts of an alloy containing 30% of aluminum, 40% of silicon and 30% of iron. The reaction carried out as described in Example 1 yields 23 parts of magnesium which precipitate in liquid form in the condenser. A residue of 104 parts is formed which consists of 92 parts of calcium ortho-silicate and 12 parts of ferro-silicon containing 33% of silicon. In the apparatus prevails an absolute gas pressure of 0.1 mm. to 100 mm. of mercury. The energy absorption is 6 watts per cm.$^2$ in the average of time. The 33% ferro-silicon is recovered by wet mill concentration.

*Example 3*

A powder of pressed mixture of 100 parts of potassium fluoride and 70 parts of calcium carbide is reacted in vacuo as described above, with formation of 67 parts of potassium vapor which condenses to liquid metal in the condenser. The residue of 103 parts which substantially consists of calcium fluoride and carbon is continuously withdrawn from the apparatus in the form of solid material. The apparatus used may be operated under a pressure between 0.1 mm. and 800 mm. The energy absorption is 4 watts per cm.$^2$ in the average of time.

*Example 4*

A mixture of 100 parts of Willemite ($Zn_2SiO_4$), 50 parts of quicklime and 30 parts of carbon is reacted continuously in the form of a powder, briquets or a mixture of granular reaction components. The reaction yields 58 parts of zinc vapor and 25 parts of carbon monoxide which escape from the furnace. The zinc vapor precipitates as liquid metal in the condenser and the carbon monoxide escapes behind the condenser; it is very pure and can be used directly in synthesis without requiring previous purification. The above quantities yield a constant residue of 77 parts. The apparatus may be operated under a pressure of between 0.1 mm. and 800 mm. The energy absorption is 7 watts per cm.$^2$ in the average of time.

*Example 5*

The production of bismuth from bismuth ores containing nickel and cobalt aresnides or sulfides is exemplary for this invention as regards the direct and thermal production of pure metal from a mixture of ores. The bismuth ores contaminated by nickel and cobalt arsenides are calcined to remove sulfur and arsenic. The calcined material is then reacted in the furnace described above with about double the quantity of coal necessary for the reduction of bismuth oxide ($Bi_2O_3$). Vaporous bismuth escapes and precipitates as liquid metal in the condenser. Carbon monoxide which has been formed simultaneously escapes from the furnace behind the condenser. The residues containing nickel and cobalt are then worked up by methods known per se. The apparatus may be operated under a pressure of between 0.1 mm. and 800 mm. The energy absorption is 4 watts per cm.$^2$ in the average of time.

*Example 6*

100 kg. of burned dolomite are mixed with 13.2 kg. of silicon in the form of 17.5 kg. of ferro-silicon containing 75% of silicon to produce magnesium according to the following equation $$2CaO + 2MgO + Si \rightarrow 2Mg + Ca_2SiO_4$$

Both starting materials are used in a grain size of up to 10 mm. and are introduced into the furnace in the form of a granular mixture.

The mixture is constantly introduced in a quantity of 300 kg./hour into a furnace as shown in the accompanying drawing which is heated to 1500–1600° C. by means of a heater 10.

Into the furnace are introduced at the same time, through pipe system 28 or the central filling hole, per hour 30 kg. of a sliding material 29 consisting of dolomite grains having a diameter of 2–10 mm.

In the course of 20 hours both materials sink in the furnace to reach grate 17 which is temporarily or permanently moved, and are removed after having passed the grate.

The magnesium vapors evolved at a temperature of the furnace as indicated above and under a reduced pressure of 1 mm. escape through pipe 7 and are condensed in a manner known per se to form liquid or solid magnesium.

47 kg. of magnesium are obtained per hour, corresponding to a yield of 80%. The reaction temperatures are limited solely by the material used as sliding layer which at a certain degree commences to adhere to the walls of the furnace. In the apparatus prevails an absolute gas pressure of 0.1 mm. up to 100 mm. of mercury. The energy absorption is 5 watts per cm.$^2$ in the average of time.

*Example 7*

Production of potassium according to the following equation $$2KF + CaC_2 \rightarrow 2K + 2C + CaF_2$$

100 kg. of potassium fluoride are mixed with 100 kg. of calcium carbide containing 74% of $CaC_2$, the whole is pressed and 32 kg. of the mixture so obtained are introduced per hour into a furnace as shown in the accompanying drawing.

At the same time 10 kg. of low temperature coke are introduced as sliding layer per hour. During the loading operation, the temperature of the furnace is kept at 1000–1200° C. by means of a heater. At such temperature the reaction takes place as illustrated by the above equation. Per hour there are obtained 10 kg. of potassium vapor which distill over by passing through pipe 7 and are then condensed in known manner. Potassium is produced in a yield of 90%.

The apparatus may be operated under a pressure of between 0.1 mm. and 800 mm. The energy absorption is 4 watts per cm.$^2$ in the average of time.

We claim:

1. A process for continuously producing vaporizable metals which comprises introducing pulverulent, reducible compounds of said metals downwardly into a side wall enclosed reaction zone, maintaining sufficient heat and pressure in said reaction zone to thermally reduce the compounds and volatilize the metals, completely shielding the side enclosure with a layer of inert pulverulent material from the effects of the reducible compounds during the introduction and heating steps, passing the volatilized metal vapors upwardly out of the reaction zone to be condensed and collected, passing the solid residue of the reduced compounds to the bottom of the reaction zone to form a supporting pile for additionally introduced vaporizable metal compounds, and continuously removing residue from the bottom of said pile while maintaining said pile within said reaction zone.

2. The process of claim 1 wherein an inert, pulverulent material, which does not react or sinter under the reaction conditions prevailing in said reaction zone, is passed downwardly through said zone concurrently with said metal compounds to shield the side enclosure, the particles of the inert material being of an average size which is about double the average particle size of the metal compounds.

3. The process of claim 1, wherein the heat requirements of said reduction are supplied by radiant heating.

4. The process of claim 1, wherein a shielding material which is reaction inert and non-sinterable under the temperature conditions prevailing in the reduction zone is introduced and maintained as a layer between the thin layer of introduced mixture and the internal boundaries of the reaction zone as a heat insulating medium, said material being withdrawn and replenished during the course of thermal reduction.

5. The process of claim 4, wherein the heat requirements of said reduction are supplied by radiant heating.

References Cited in the file of this patent

UNITED STATES PATENTS

| | | |
|---|---|---|
| 1,149,495 | Carson | Aug. 10, 1915 |
| 2,201,738 | Neve | May 21, 1940 |
| 2,247,334 | Keemle | June 24, 1941 |
| 2,255,844 | Gentile | Sept. 16, 1941 |
| 2,358,024 | Najarian | Sept. 12, 1944 |
| 2,404,328 | Turin et al. | July 16, 1946 |
| 2,446,403 | Bassereau | Aug. 3, 1948 |
| 2,472,612 | Poland | June 7, 1949 |
| 2,558,744 | Fouquet | July 3, 1951 |
| 2,684,898 | Barton | July 27, 1954 |
| 2,761,672 | Wilkins | Sept. 4, 1956 |

UNITED STATES PATENT OFFICE

CERTIFICATE OF CORRECTION

Patent No. 2,920,951 January 12, 1960

Otto Bretschneider et al.

It is hereby certified that error appears in the printed specification of the above numbered patent requiring correction and that the said Letters Patent should read as corrected below.

Column 2, line 29, for "subject" read -- subjected --; column 3, line 57, for "power" read -- powder --; column 8, line 49, for "aresnides" read -- arsenides --.

Signed and sealed this 5th day of July 1960.

(SEAL)
Attest:

KARL H. AXLINE
Attesting Officer

ROBERT C. WATSON
Commissioner of Patents